United States Patent [19]
Kennedy

[11] Patent Number: 6,038,299
[45] Date of Patent: Mar. 14, 2000

[54] DISPENSER WITH VANDAL RESISTANT COIN VALIDATOR RUNWAY

[75] Inventor: Michael Richard Kennedy, Calgary, Canada

[73] Assignee: Nortel Networks Corporation, Montreal, Canada

[21] Appl. No.: 09/019,205

[22] Filed: Feb. 5, 1998

[51] Int. Cl.$^7$ .................................................. H04M 17/00
[52] U.S. Cl. ........................ 379/150; 379/145; 194/344
[58] Field of Search ..................... 379/130–132, 379/143, 145–155; 194/344; 232/7, 9, 44, 55, 60

[56] References Cited

U.S. PATENT DOCUMENTS

| | | | |
|---|---|---|---|
| 2,251,073 | 7/1941 | Shann | 379/148 |
| 2,509,477 | 5/1950 | Carson et al. | 379/148 |
| 4,899,371 | 2/1990 | Su | 379/146 |
| 5,483,583 | 1/1996 | Chen | 379/148 |

*Primary Examiner*—Paul Loomis

[57] ABSTRACT

A dispenser for dispensing goods or services is resistant to fraudulent vandalism by use of a hacksaw by having a coin receiver including a coin runway having at least one guide surface to guide a coin along a runway axis. The runway has at least one moveable member located closely adjacent to the guide surface and mounted for movement relative to the guide surface. The moveable member has a moveable surface with a displacement component parallel to the runway axis so that when contacted by a reciprocating hacksaw, the moveable surface moves in the direction of the hacksaw to reduce relative movement between the hacksaw and the surface, thus preventing sawing of the member. In one embodiment, the moveable member is a rotatable member which is mounted so as to have an uppermost surface flush with the guide surface of the runway.

34 Claims, 3 Drawing Sheets

DISPENSER WITH VANDAL RESISTANT COIN VALIDATOR RUNWAY

BACKGROUND OF THE INVENTION

This invention relates to a vandal resistant dispenser for dispensing goods or services such as communications services. More particularly, the invention relates to a coin receiver having a runway with enhanced resistance to vandalism inflicted by a hacksaw.

Hacksaw blades are often used to gain unauthorized access to restricted areas or equipment by sawing through door bolts of a door lock. One way of restricting access in this manner is to provide a hardened steel cylindrical rod journalled for free rotation within a longitudinal bore in the bolt. If a person attempts to saw through the door bolt, the hacksaw blade encounters the steel rod which rotates as the saw is reciprocated. Rotation of the rod reduces any relative movement between the hacksaw blade and the rod, thus preventing the saw from sawing through the rod and preventing further cutting through the door bolt.

Coin operated machines to dispense goods or services are used in many applications throughout the world and are subject to hacksaw vandalism, often by unsophisticated fraud vandals who attempt to retrieve coins from the machines. A common approach by such vandals is to insert a relatively fine hacksaw blade through a coin-receiving bezel. The bezel discharges the coins into a coin runway which directs the coins into a coin validation device of a dispenser for dispensing the goods or services.

Commonly, a vandal will attempt to saw through a lower guide surface or guide groove in the runway in an attempt to access coins already received. While there is little or no threat to the received coins when using this approach, sawing through the coin runway can result in damage to adjacent portions of the apparatus. For example, the saw can damage flexible electrical circuits which may be located adjacent to the runway. This may prevent further use of the apparatus.

In some countries, repairing coin operated machines from the above type of vandalism can be costly. It would be desirable to provide a dispenser with a coin runway which is not only resistant to vandalous attempts at forced entry, but would also clearly indicate to the vandal that continuation of the attempt would not be productive.

SUMMARY OF THE INVENTION

In accordance with one aspect of the invention, there is provided a services vending apparatus including a coin receiver having a coin runway with at least one guide surface to guide a coin along a runway axis and at least one moveable member located closely adjacent to the guide surface and mounted for movement relative to the guide surface. There is also provided a dispenser for dispensing a service in response to receipt of a coin from the guide surface.

The dispenser may dispense communications services and may include telephone circuitry for conducting a telephone call. The dispenser renders operative the telephone circuitry in response to receipt of a coin from the guide surface. The dispenser may also or alternatively include data communications circuitry for transmitting and receiving data, the dispenser rendering operative the data communications circuitry in response to receipt of a coin from the guide surface.

In accordance with another aspect of the invention, there is provided a goods vending apparatus including a coin receiver having a coin runway with at least one guide surface to guide a coin along a runway axis and at least one moveable member located closely adjacent to the guide surface and mounted for movement relative to the guide surface and a dispenser for dispensing goods in response to receipt of a coin from the guide surface.

In accordance with another aspect of the invention, there is provided an apparatus for receiving coins including a coin runway and at least one moveable member. The coin runway has at least one guide surface to guide a coin along the runway axis and the moveable member is located closely adjacent to the guide surface and is mounted for movement relative to the guide surface. The moveable member has a moveable surface with a displacement component parallel to the runway axis.

In one embodiment, the moveable member includes a rotatable member which is journalled for rotation about an axis of rotation which is non-parallel to the runway axis. There may be a plurality of rotatable members located closely adjacent the guide surface and spaced longitudinally therealong, each of the rotatable members being journalled for rotation relative to the guide surface.

Preferably, the rotatable members are parallel to each other and have respective axes of rotation disposed perpendicularly to the runway axis.

In accordance with another aspect of the invention, there is provided a coin runway and provisions for resisting cutting of the coin runway. The coin runway has at least one guide surface to guide a coin along a runway axis, and the provisions for resisting cutting include a moveable surface and provisions for mounting the moveable surface adjacent the coin runway. The provisions for resisting cutting may include a rotatable member and the moveable surface may be on the rotatable member. The provisions for mounting may mount the rotatable member for rotation relative to the coin runway. Preferably, the rotatable member is mounted for rotation about an axis perpendicular to an axis of the runway. In another embodiment, the provisions for resisting cutting include a plurality of moveable surfaces which include a plurality of rotatable members and the moveable surfaces are on the moveable members.

The invention reduces the difficulties and disadvantages of the prior art by providing a simple structure to protect a coin runway in a goods or services vending apparatus from hacksaw vandalism. In addition, when a vandal encounters an apparatus according to the invention, it rapidly becomes apparent to the vandal that use of the hacksaw will not provide access to the coins, which usually results in the vandal stopping the destructive activity with negligible damage to the apparatus, thus permitting continued usage of the machine without need for repair or replacement.

BRIEF DESCRIPTION OF THE DRAWINGS

In drawings which illustrate embodiments of the invention.

DETAILED DESCRIPTION

FIG. 1

Figure 1:
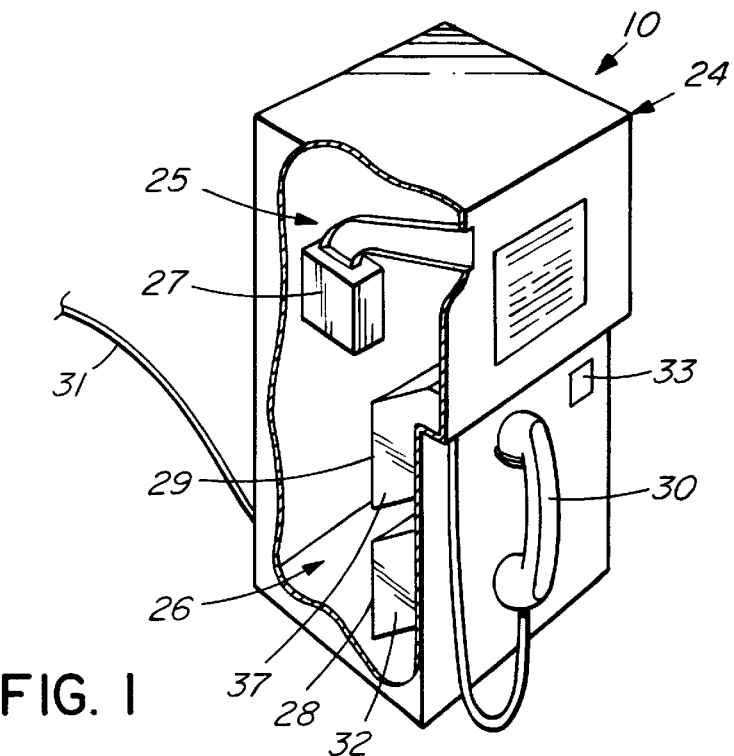
FIG. 1 is a fragmented perspective view of a coin operated dispensing machine according to a first embodiment of the invention.

Referring to FIG. 1, a communications services vending apparatus according to a first embodiment of the invention is shown generally at 10. In this embodiment, the apparatus is a pay telephone 24 having a coin receiver 25, and a dispenser circuit 26 responsive to coins received at the coin receiver 25.

The dispenser circuit 26 includes a coin validator 27 for determining the denominations of coins received by the coin receiver 25 and for rendering a signal active in response to receipt of a pre-defined quantity of money, in coins. The dispenser circuit 26 further includes telephone circuitry 28 for conducting a telephone call and data communications circuitry 29 for transmitting and receiving data, in response to the signal produced by the coin validator 27. The telephone circuitry 28 includes a handset 30 and a central office line 31 and telephone circuits 32 for establishing a communications path between the central office line 31 and the handset 30. The data communications circuitry 29 includes a data jack 33 and the central office line 31 and circuitry 37 for establishing a communications path between the data jack and the central office line.

FIG. 2

Figure 2:
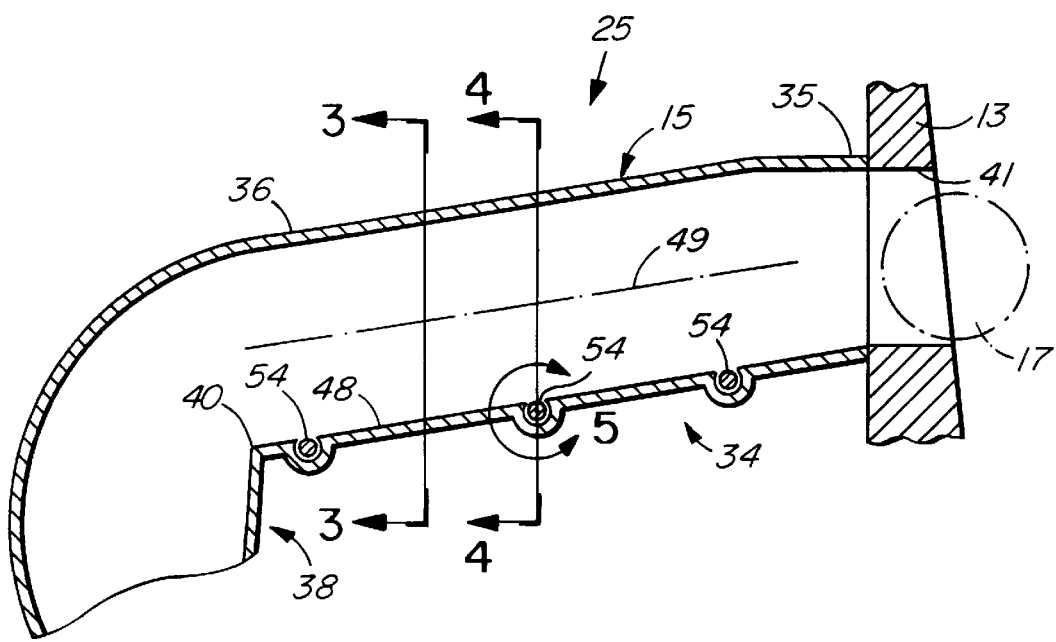
FIG. 2 is a fragmented longitudinal sectional view of a coin validation runway according to the first embodiment of the invention.

Referring to FIG. 2, the coin receiver includes a bezel 13 mounted on a front face of the vending apparatus. To the bezel is mounted a coin runway 15 having a generally straight, shallowly inclined, primary section 34 having a receiving portion 35 adjacent the bezel 13 to receive the coin, and a discharge portion 36 to discharge the coin downwardly. The runway 15 also has a secondary section 38 connected to the discharge portion 36 and inclined more steeply than the primary section to provide a corner 40 between the primary and secondary sections as shown. The secondary section 38 discharges coins into the coin validator 27 of FIG. 1.

FIG. 3

Figure 3:
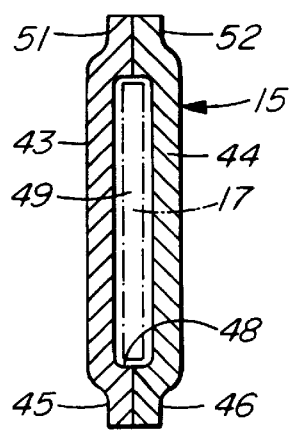
FIG. 3 is a transverse cross-sectional view of the coin validation runway taken along line 3—3 of FIG. 2.

Referring to FIG. 3, the coin runway 15 has a pair of oppositely facing, vertical sidewalls 43 and 44, which have respective oppositely facing lower portions 45 and 46 which are connected together to form a guide surface 48 to support the coin thereon. The guide surface 48 is a lower surface of the runway 15, which, in combination with the sidewalls 43 and 44 guides the coin along a runway axis 49 between the receiving and discharge portions 35 and 36 respectively, shown in FIG. 2.

Referring back to FIG. 3, the sidewalls 43 and 44 have similar upper portions 51 and 52 respectively which are connected together so as to form a closed, generally rectangular-sectioned passage. Referring back to FIG. 2, the passage receives and guides the coin 17 which runs along an edge thereof first through the primary section, around the corner 40 and down the secondary section 38. The structure described above can be manufactured by plastic injection moulding methods similar to the prior art.

Figure 4:
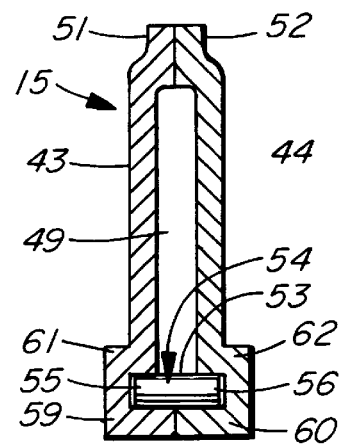
FIG. 4 is a transverse cross-sectional view of the coin validation runway taken along line 4—4 of FIG. 2.

FIGS. 2 and 4

Still referring to FIG. 2, the coin receiver further includes a plurality of rollers or rotatable members 54 which are located generally adjacent the guide surface 48 and are journalled for rotation with respect to the guide surface. Referring to FIGS. 2 and 4, a typical roller 54 includes a generally cylindrical rod having opposite ends 55 and 56 received in recesses 59 and 60 provided on opposite sides of, and substantially adjacent the guide surface 48. The recesses 59 and 60 are aligned transversely to the runway and have a shape generally complementary to the opposite ends of the rollers to journal the rollers for free rotation therein. The lower portions 45 and 46 of the sidewalls have shallow bosses 61 and 62 respectively which contain the recesses 59 and 60 and which extend outwardly from the sidewalls 43 and 44 respectively as best seen in FIG. 4. The recesses have diameters selected to permit the respective roller to rotate freely within the recesses. An uppermost mid-portion 53 of the roller is exposed to the passage between the sidewalls 43 and 44 and the recesses 59 and 60. Referring to FIG. 2, the embodiment shown has three rollers and respective recesses which are spaced longitudinally apart along the guide surface 48 typically at a spacing of between 2 and 4 cm, depending on the application of the machine. Preferably, an innermost roller 54 is located closely adjacent the corner 40 to protect the corner 40, which is most vulnerable to damage by a hacksaw blade as will be described. The rollers 54 are journalled for rotation about respective axes of rotation, which are parallel to each other and preferably are perpendicular to the runway axis 49 when viewed from above.

FIG. 5

Figure 5:
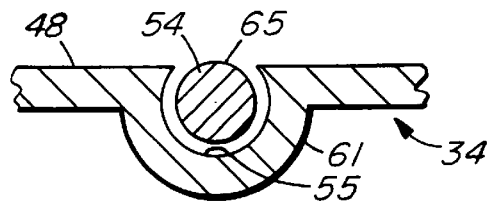
FIG. 5 is an enlarged cross-sectional view taken along line 5—5 of FIG. 2 of a rotatable member and journalling means thereof, according to the first embodiment of the invention.

Referring to FIG. 5, the roller 54 has an uppermost surface or movable contact surface 65 which is substantially flush with the guide surface 48 of the primary section 34. The recesses 59 and 60 act as means for mounting the roller or more particularly, the movable contact surface on the roller adjacent the coin runway for movement relative thereto. The contact surface 65 could be positioned to stand slightly proud of the guide surface 48, provided it does not interfere with the free passage of a coin rolling downwardly along the guide surface 48. The uppermost contact surface 65 could alternatively be located somewhat below the guide surface 48 to a depth of about 0.5 mm. If the contact surface 65 is much lower than about 0.5 mm below the guide surface 48, problems can arise as will be described.

In this embodiment, the rollers 54 are made from cylindrical rods of stainless steel which is non-magnetic and thus will not attract magnetisable iron filings or other metallic contamination which could be prone to collect between the rollers and the recesses, restricting rotation of the rollers. Each roller has a diameter of approximately 3.0 mm and is sufficiently long to provide adequate journalling on opposite sides of the guide surface 48. The runway 15 is assembled by injection moulding the two sidewalls 43 and 44, and then fitting the rollers 54 into their respective recesses, in one sidewall, after which the upper and lower portions 51 and 52, and 45 and 46 are connected together to form an integral unit which is easily substituted for existing prior art coin runways.

Referring back to FIG. 1, the secondary section 38 is positioned above the coin validator 27 to direct coins received at the coin receiver 25 into the coin validator. Thus, the dispenser receives coins from the guide surface 48 of the coin receiver 25 and renders active the dispensing signal to render operational the telephone circuitry 28 or data communications circuitry 29 selected by the user. The apparatus shown in FIG. 1 thus acts as a communications services vending apparatus.

FIG. 6

Figure 6:
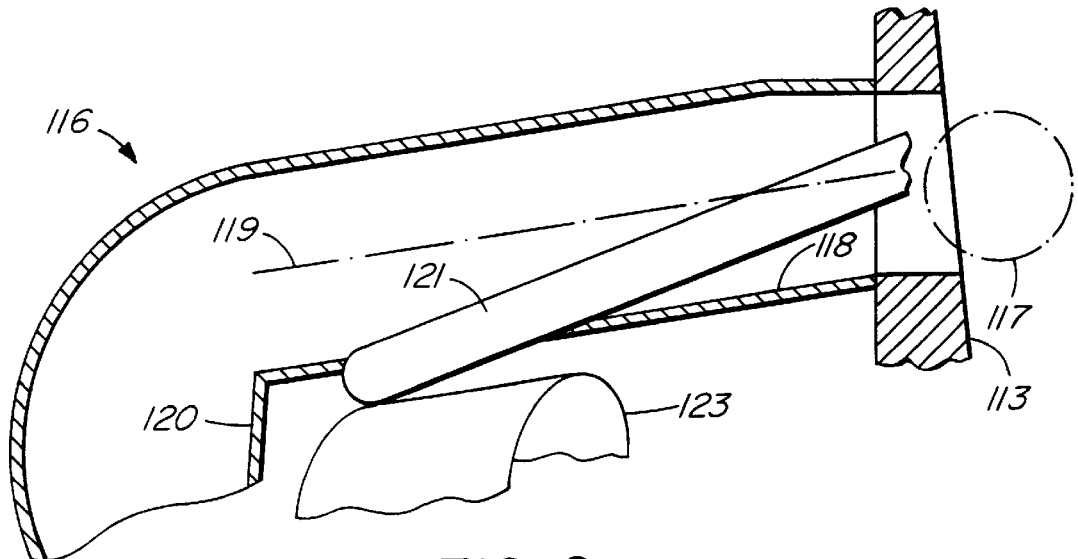
FIG. 6 is a fragmented longitudinal sectional view of a portion of a prior art coin runway showing vandalism with a fine hacksaw blade.

Referring to FIG. 6, a prior art coin runway 116 communicates with a bezel 113 to receive a coin, shown in broken outline at 117. The coin runway 16 has a guide surface 118 to guide the coin 117 along a runway axis 119, the axis 119 being parallel to the guide surface 118. The coin runway has a discharge portion 120 which feeds coins into a coin validator (not shown in FIG. 6).

Coin runways of the prior art are commonly manufactured by plastic injection processes and are subject to vandalism using simple tools such as a fine hacksaw blade 121. A vandal normally inserts the blade 121 through the bezel 113 and, when the blade is suitably inclined and reciprocated, it can saw through at least portions of the guide surface 118. In many coin operated machines, ancillary equipment, such as a flexible electronic circuit 123 is located adjacent the coin runway, and using a saw to saw through the runway can damage the flexible circuit or related equipment. Even if the flexible circuit or related equipment are not damaged, sawing through the guide surface of the runway usually restricts passage of coins along the runway which prevents further operation of the equipment, resulting in a loss of revenue due to repair and replacement costs to install a new runway.

Referring to FIGS. 2–5, in the coin receiver according to the first embodiment of the invention, the runway 15 resists the fraudulent vandalism described with respect to the prior art structure of FIG. 6 by providing the guide surface 48 with at least one moveable member which resists cutting by a hacksaw. Because the rollers 54 are mounted for relatively free rotation, when contacted by teeth of a hacksaw blade they rotate freely so that the uppermost contact surface 65 moves in the same direction and at the same speed as the hacksaw blade as the blade is reciprocated generally along the runway axis 49. Thus, there is essentially negligible relative movement between the teeth of the hacksaw blade and the rollers, and the hacksaw blade cannot cut into the rollers. Thus, the rollers 54 provide a plurality of moveable members which are located closely adjacent to the guide surface 48 and which have a contact surface that is, the outer surface of the moveable members, mounted for movement relative to the guide surface 48. The moveable member thus has a moveable surface (the contact surface) with a displacement component parallel to the runway axis 49 so that the contact surface can move in the same direction as the hacksaw blade.

If the uppermost contact surface 65 of the roller 54 is disposed slightly above the guide surface 48, and if the cutting edge of the hacksaw blade is generally parallel to the guide surface 48, the guide surface 48 is essentially free of any chance of damage from the hacksaw blade. On the other hand, if the uppermost contact surface 65 is below the guide surface 48 by a depth greater than about 0.5 mm, the hacksaw blade could cut a groove into the guide surface 48 until interference occurs between the blade 21 and the rollers and this groove could interfere with coins rolling along the guide surface 48.

As shown in FIG. 6, a vandal typically commences sawing of the runway with the blade 121 inclined at an angle to the guide surface 118. Referring to FIG. 2, the angle is dependent on the relative location of an upper surface 41 of the bezel 13 and the corner 40 between the primary and secondary sections of the runway 15. If the blade is inclined obliquely as shown in FIG. 6, the corner 40 shown in FIG. 2 would be cut initially by the saw, and further cutting would be subsequently prevented as the saw contacts the roller 54 located closest to the corner 40. Consequently, to reduce damage, the innermost roller 54 should be located as closely as possible to the corner 40. Thus the innermost roller 54 closest to the corner 40 is the minimum required to provide protection. There is however, a negligible increase in cost to provide the additional rollers spaced along the runway as shown to provide additional protection.

Alternatives

In the above embodiment, the moveable members are rotatable members or rollers having axes of rotation disposed perpendicularly to the runway axis 49, such that the displacement components of the contact surfaces of each roller are always parallel to the runway axis 49. In an alternative, embodiment (not shown) each roller could have an axis of rotation which is non-perpendicular to the runway axis, and this would still provide a contact surface with a displacement component parallel to the runway axis. In general, the rotatable member must be journalled about an axis of rotation which is non-parallel to the runway axis. For uniformity, and ease of manufacturing, the rotatable members are equally sized rollers with uppermost or contact surfaces which are generally coplanar with each other and generally flush with the guide surface.

The apparatus described in FIGS. 1 through 5 has a vertically disposed coin runway, that is, the bezel 13 has a vertical slit, and the coin is maintained in a generally vertical plane as it runs along the runway 15. This arrangement is intended for use in coin operated telephones and in such an arrangement contact surfaces of the rollers are located adjacent at least one guide surface 48, namely the lower surface of the runway which guides the coin along the runway axis.

In alternative embodiments, the bezel may have a horizontal slit and direct coins into a coin runway which initially locates the coins generally horizontally prior to the coins falling in a generally vertical disposition to a coin validator. Horizontally disposed bezels are found on some coin operated beverage dispensing machines and the like wherein the coin validator is located adjacent a front edge of a coin dispensing machine.

FIG. 7

Figure 7:
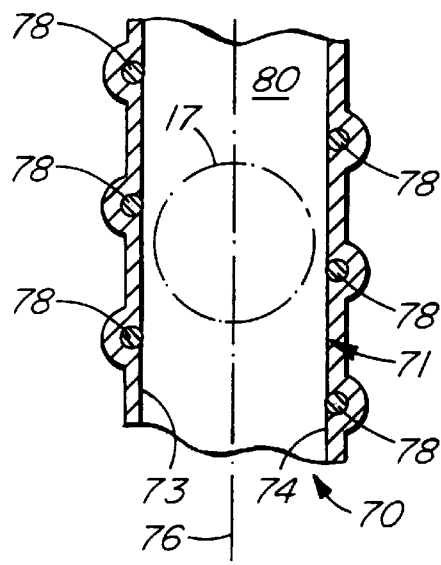
FIG. 7 is a longitudinal sectional view of a coin runway according to a second embodiment of the invention.

Referring to FIG. 7, an apparatus according to a second embodiment of the invention has a horizontally disposed coin runway 71 having inclined first and second guide surfaces 73 and 74 disposed oppositely to each other and at equal distances from a centrally located runway axis 76. The guide surfaces 73 and 74 have a plurality of rollers or rotatable members 78 spaced therealong, the rollers on the first guide surface 73 being staggered with respect to the rollers on the guide surface 74. A coin 17 passing down the runway 71 is constrained by the guide surfaces 73 and 74 and sidewalls interconnecting the guide surfaces, only one sidewall 80 being shown. The coin runway 71 has a cross-sectional shape generally similar to the coin runway 15 in FIGS. 2–5. Similarly to the apparatus of the first embodiment, the rollers 78 are located closely adjacent the guide surfaces 73 and 74 to prevent a hacksaw from cutting into the guide surfaces 73 and 74.

FIG. 8

Figure 8:
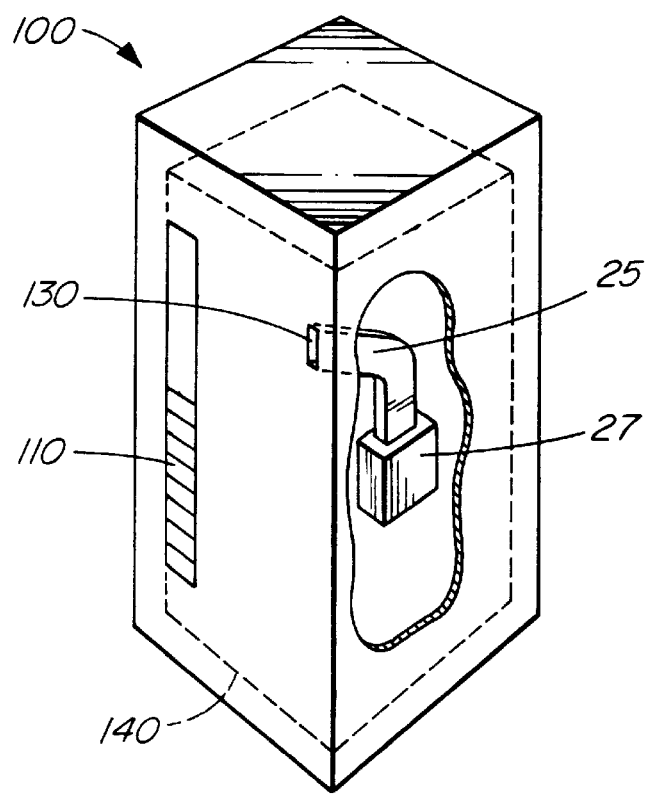
FIG. 8 is a perspective view of a goods dispensing apparatus, according to a third embodiment of the invention.

Referring to FIG. 8, a coin operated dispensing or vending machine according to a further embodiment of the invention, is shown generally at 100 and contains goods 110, e.g. beverage cans operable to be dispensed. The machine 100 includes the coin receiving apparatus 25 as described in FIGS. 2–5 and has a bezel 130 to receive coins, and a coin validator 27 as described above to validate and store the coins and to produce a signal in response to receipt of a pre-defined quantity of money. A conventional dispenser mechanism 140 dispenses a beverage can in response to such signal.

While specific embodiments of the invention have been described and illustrated, such embodiments should be considered illustrative of the invention only and not as limiting the invention as construed in accordance with the accompanying claims.

What is claimed is:

1. An apparatus for receiving coins, the apparatus comprising:
   a) a coin runway having at least one guide surface to guide a coin along a runway axis; and
   b) at least one rotatable member journalled for rotation about an axis of rotation, said axis of rotation being fixed in a position such that said rotatable member has a movable portion located closely adjacent said guide surface.

2. An apparatus as claimed in claim 1 wherein said moveable portion has a displacement component parallel to the runway axis.

3. An apparatus claimed in claim 1 wherein said axis of rotation is non-parallel to the runway axis.

4. An apparatus claimed in claim 3 wherein said axis of rotation is perpendicular to the runway axis.

5. An apparatus is claimed in claim 1 wherein said moveable portion is substantially flush with said guide surface.

6. An apparatus claimed in claim 1 wherein said at least one rotatable member includes a plurality of rotatable members having respective moveable portions located closely adjacent said guide surface and spaced longitudinally therealong, each of said rotatable members being journalled for rotation relative to said guide surface.

7. An apparatus is claimed in claim 6 wherein said rotatable members are parallel to each other.

8. An apparatus is claimed in claim 6 wherein said rotatable members are journalled for rotation about respective axes of rotation which are non-parallel to the runway axis.

9. An apparatus is claimed in claim 8 wherein said respective axes of rotation of said rotatable members are perpendicular to the runway axis.

10. An apparatus is claimed in claim 6 wherein said respective movable portions are generally flush with said guide surface.

11. An apparatus is claimed in claim 6 wherein said moveable portions are generally co-planar with each other.

12. An apparatus as claimed in claim 1 wherein:
   a) said coin runway has a generally straight, shallowly inclined, primary section having a receiving portion to receive the coin and a discharge portion to discharge the coin, said runway also having a secondary section connected to said discharge portion and inclined more steeply than said primary section to provide a corner between said primary and secondary sections; and
   b) wherein said rotatable member is located closely adjacent said corner.

13. An apparatus as claimed in claim 1 wherein said coin runway has at least one recess which is generally complementary to said rotatable member to journal said rotatable member relative thereto.

14. An apparatus is claimed in claim 1 wherein said rotatable member has first and second cylindrically-shaped opposite ends and wherein said coin runway has a pair of recesses aligned transversely to said coin runway, said recesses having a shape generally complementary to said opposite ends of said rotatable member to journal said rotatable member relative thereto.

15. An apparatus as claimed in claim 1 wherein said coin runway has a pair of oppositely facing side walls, each side wall having a pair of oppositely facing lower portions which form said guide surface to support the coin thereon.

16. An apparatus is claimed in claim 15 wherein said lower portions of said side walls have transversely aligned recesses to receive respective ends of said rotatable member therein to provide for rotational movement thereof.

17. An apparatus as claimed in claim 1 wherein said rotatable member is non-magnetic.

18. An apparatus is claimed in claim 1 wherein said rotatable member includes a generally cylindrical rod.

19. An apparatus is claimed in claim 1 wherein said rotatable member is formed of stainless steel.

20. An apparatus as claimed in claim 1 wherein:
   said coin runway has a pair of oppositely facing guide surfaces to guide the coin.

21. An apparatus as claimed in claim 20 wherein each guide surface has a respective recess for mounting said rotatable member such that said rotatable member has a displacement component parallel to the runway axis.

22. An apparatus as claimed in claim 20 wherein said rotatable member is rotatable relative to said guide surfaces.

23. An apparatus for receiving coins, the apparatus comprising:
   a) a coin runway having at least one guide surface to guide a coin along a runway axis; and
   b) means for resisting cutting of said coin runway.

24. An apparatus as claimed in claim 23 wherein said means for resisting cutting includes a moveable surface adjacent said coin runway.

25. An apparatus as claimed in claim 24 wherein said means for resisting cutting includes a rotatable member, said moveable surface being on said rotatable member.

26. An apparatus as claimed in claim 25 further including means for mounting said rotatable member for rotation relative to said coin runway.

27. An apparatus as claimed in claim 26 wherein said rotatable member is mounted for rotation about an axis perpendicular to an axis of said runway.

28. An apparatus as claimed in claim 23 wherein said means for resisting cutting includes a plurality of moveable surfaces adjacent said runway.

29. An apparatus as claimed in claim 28 wherein said means for resisting cutting includes a plurality of rotatable members, said moveable surfaces being on said moveable members.

30. A goods vending apparatus comprising:
   a) a coin receiver including a coin runway having at least one guide surface to guide a coin along a runway axis and at least one rotatable member journalled for rotation about an axis of rotation, said axis of rotation being fixed in a position such that said rotatable member has a movable portion located closely adjacent said guide surface; and
   b) a dispenser for dispensing goods in response to receipt of a coin from said at least one guide surface.

31. A services vending apparatus comprising:
a) a coin receiver including a coin runway having at least one guide surface to guide a coin along a runway axis and at least one rotatable member journalled for rotation about an axis of rotation, said axis of rotation being fixed in a position such that said rotatable member has a movable portion located closely adjacent said guide surface; and
b) a dispenser for dispensing a service in response to receipt of a coin from said at least one guide surface.

32. An apparatus as claimed in claim 31 wherein said dispenser dispenses communications services.

33. An apparatus as claimed in claim 32 wherein said dispenser includes telephone circuitry for conducting a telephone call, said dispenser rendering operative said telephone circuitry in response to receipt of a coin from said at least one guide surface.

34. An apparatus as claimed in claim 32 wherein said dispenser includes data communications circuitry for transmitting and receiving data, said dispenser rendering operative said data communications circuitry in response to receipt of a coin from said at least one guide surface.

* * * * *